United States Patent
Lynch et al.

(10) Patent No.: US 8,055,939 B2
(45) Date of Patent: Nov. 8, 2011

(54) MEMORY CONTROL DEVICE AND METHODS THEREOF

(75) Inventors: David M. Lynch, Austin, TX (US); Andelon X. Tra, Austin, TX (US); Oswin E. Housty, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 387 days.

(21) Appl. No.: 12/236,849

(22) Filed: Sep. 24, 2008

(65) Prior Publication Data

US 2010/0077253 A1 Mar. 25, 2010

(51) Int. Cl.
*G06F 11/00* (2006.01)
(52) U.S. Cl. ............................ 714/10; 714/43
(58) Field of Classification Search ............... None
See application file for complete search history.

(56) References Cited

U.S. PATENT DOCUMENTS

| | | | | |
|---|---|---|---|---|
| 6,377,543 | B1 * | 4/2002 | Grover et al. | 370/227 |
| 6,658,478 | B1 * | 12/2003 | Singhal et al. | 709/232 |
| 6,952,734 | B1 * | 10/2005 | Gunlock et al. | 709/227 |
| 6,981,174 | B1 * | 12/2005 | Hanning | 714/5.1 |
| 7,290,166 | B2 * | 10/2007 | Rothman et al. | 714/6.11 |
| 7,401,161 | B2 * | 7/2008 | Lee et al. | 709/249 |
| 7,437,608 | B2 * | 10/2008 | Kalos et al. | 714/16 |
| 7,716,525 | B1 * | 5/2010 | Buchko et al. | 714/22 |
| 2005/0149776 | A1 * | 7/2005 | Hinrichs | 714/10 |
| 2006/0026319 | A1 * | 2/2006 | Rothman et al. | 710/100 |
| 2008/0301495 | A1 * | 12/2008 | Kalos et al. | 714/16 |
| 2010/0191894 | A1 * | 7/2010 | Bartley et al. | 711/5 |

\* cited by examiner

*Primary Examiner* — Christopher McCarthy

(57) ABSTRACT

A method includes establishing a first link between a first processor device and a first memory module at a first time. A second link is established between a second processor device and a second memory module at a second time. In response to receiving a first event indicator, a third link is established between the first processor device and the second memory module at a third time, the third time after the first time and the second time.

7 Claims, 4 Drawing Sheets

MEMORY CONTROL DEVICE AND METHODS THEREOF

FIELD OF THE DISCLOSURE

The present disclosure relates generally to data processing devices, and more particularly to memory interfaces for data processing devices.

BACKGROUND

Data processing devices can include multiple processor devices. In order to perform specified tasks, the processor devices typically access memory modules to store and retrieve information. Stored information can include instructions and data necessary to perform an intended task. In some configurations, each processor device is configured to access a subset of available memory modules, whereby the processor device handles all accesses to its associated memory modules. Therefore, a failure at a processor device can render the associated memory modules inaccessible.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A device and methods are disclosed herein that enable each processor device in a multiprocessor device to access any memory modules. Accordingly, if a processor device fails, or is otherwise deactivated, the remaining processor devices can still access the memory module associated with that processor device. Further, memory resources can be easily shared or allocated between the processor devices.

Figure 1:
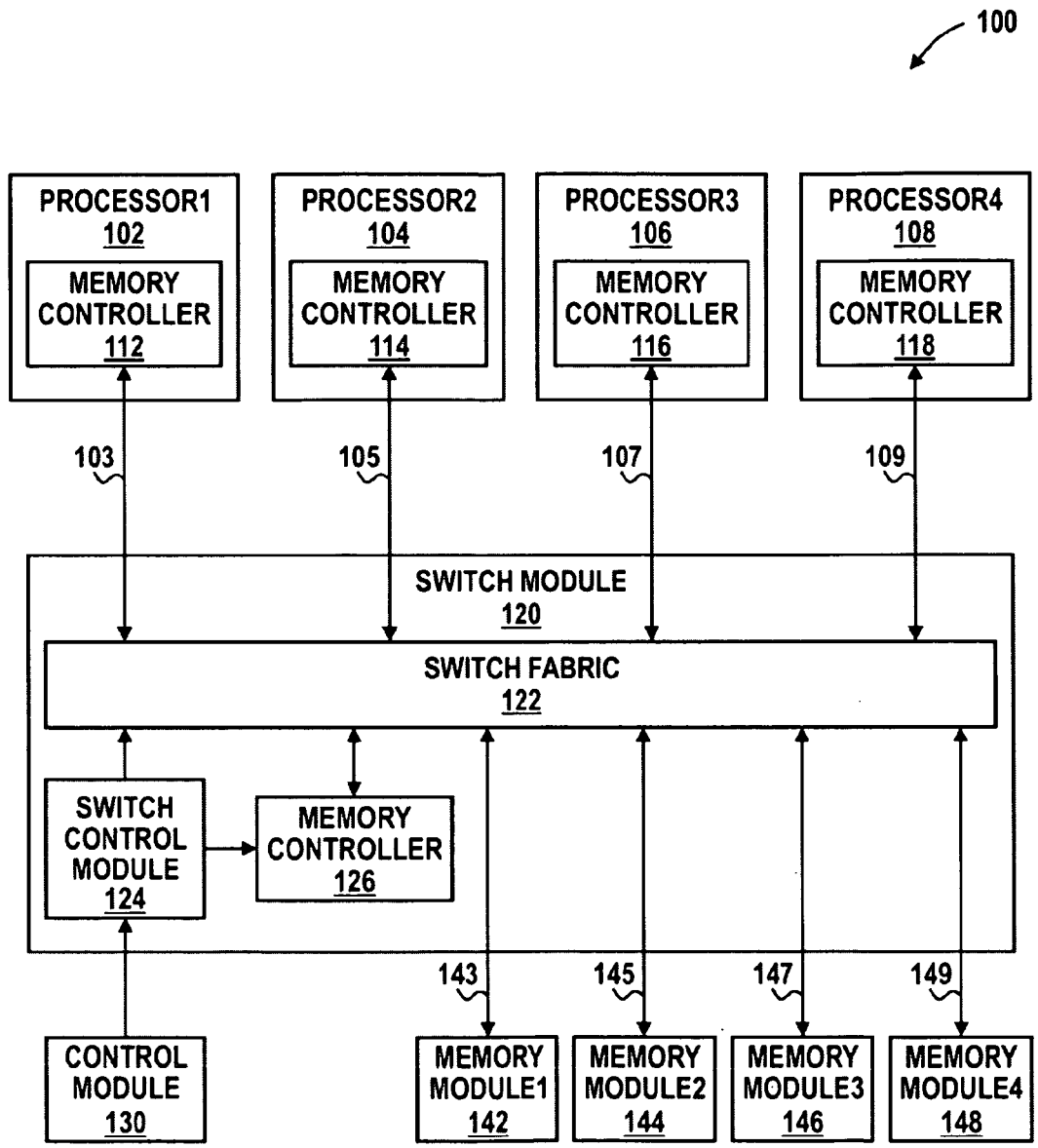
FIG. 1 includes a block diagram illustrating a multiprocessor device in accordance with a specific embodiment of the present disclosure.

FIG. 1 includes a block diagram illustrating a multiprocessor device 100 in accordance with a specific embodiment of the present disclosure. Multiprocessor device 100 includes processor devices 102, 104, 106, and 108, a switch module 120, a control module 130, memory modules 142, 144, 146, and 148, and links 103, 105, 107, 109, 143, 145, 147, and 149. Processor device 102, labeled "PROCESSOR1", includes a memory controller 112, processor device 104, labeled "PROCESSOR2", includes a memory controller 114, processor device 106, labeled "PROCESSOR3", includes a memory controller 116, and processor device 108, labeled "PROCESSOR4", includes a memory controller 118. Switch module 120 includes a switch fabric 122, a switch control module 124, and a memory controller 126.

Switch fabric 122 is connected to memory controller 112 via link 103, to memory controller 114 via link 105, to memory controller 116 via link 107, and to memory controller 118 via link 109. Switch fabric 122 is also connected to memory module 142, labeled "MEMORY MODULE1" via link 143, to memory module 144, labeled "MEMORY MODULE2" via link 145, to memory module 146, labeled "MEMORY MODULE3" via link 147, and to memory module 148, labeled "MEMORY MODULE4" via link 149. Switch fabric 122 has an input and an input/output. Switch control module 124 has an input, a first output connected to the input of switch fabric 122, and a second output. Memory controller 126 has an input connected to the second output of switch control module 124, and an input/output connected to the input/output of switch fabric 122. Control module 130 has an output connected to the input of switch control module 124.

Links 103-109 can each be configured to communicate physical layer (PHY) memory signals, or they can be configured to communicate signals implementing a high-level bus protocol such a Hyper Transport (HT). The PHY or HT signals include memory access information, such as address and data information. Links 143-149 are configured to communicate PHY memory signals. In one embodiment, links 103-109 and 143-149 are each configured to communicate Double Data Rate (DDR) PHY signals in compliance with the Joint Electron Device Engineering Council (JEDEC) DDR standard.

Memory modules 142-148 are each physical memory devices configured to store information and retrieve stored information. In a particular embodiment, each of memory modules 142-148 is a random access memory (RAM) module, such as DDR RAM. Each of memory modules 142-148 is configured to receive memory access requests via the link associated with the memory module and respond to those requests. For example, in response to a read request for a designated memory address received via link 143, memory module 142 is configured to retrieve data stored at the memory address and communicate the data via link 143. In the illustrated embodiment, each of memory modules 142-148 is associated with a designated set of unique memory addresses.

Switch fabric 122 is configured to provide connections between links 103-109 (processor links) and links 143-149 (memory links). Further, switch fabric 122 is configured to establish and disestablish connections between processor links 102-109 and memory links 143-149 based upon control information received from switch control module 124. Switch fabric 122 can conduct PHY signals between a processor link and an appropriate memory link 143-149. A link connection provided by switch fabric 122 can include a direct electrical connection, or can include transceiver circuitry to couple the processor link to the memory link. In another embodiment, switch fabric 122 can receive a PHY request at a processor link, and memory controller 126 can provide a PHY request to the appropriate memory link. In yet another embodiment, memory controllers 112-118 can provide switch fabric 122 with memory access requests using a high-level bus protocol, such as HT, and memory controller 126 can provide a PHY request to the appropriate memory link.

Switch control module 124 is configured to receive event indications from control module 130 and, based on the event indications, provide control information to switch fabric 122 to establish and disestablish connections between links. Control module 130 is configured to determine designated events at data processing device 100 and provide event indicators to switch control module 124 based on the events. For example, in a particular embodiment control module 130 can determine a failure of one of processors 102-108 indicating that the failed processor can no longer function, and provide information to switch control module 124 indicating the failed processor. In another embodiment, control module 130 can determine that memory resources for each of processors 102-108 have been adjusted, and provide information to switch control module 124 indicating the adjustment. Control module 130 notifies switch control module 124 of memory access requests, and provides switch control module 124 with the memory address associated with the memory access request.

Each of processor devices 102-108 is a device configured to execute program instructions to perform designated tasks. In an embodiment, each of processor devices 102-108 includes an instruction pipeline (not shown) to execute the program instructions. In conjunction with instruction execution, each of the processor devices 102-108 can communicate load and store commands (collectively referred to as memory commands) to retrieve data from and store data to memory. Each memory command includes a memory address associated with the command.

Each of memory controllers 112-118 is configured to receive memory commands from the associated processor device. For example, memory controller 112 is configured to receive memory commands from the instruction pipeline at processor device 102. Memory controllers 112-118 can include integrated dynamic random access memory (DRAM) controllers, which provide PHY memory interface signals. In the illustrated embodiment of FIG. 1, the address range of each of memory controllers 112-118 can be configured to access any of memory modules 142-148. In response to determining a received command is associated with a memory address associated with a particular memory module, switch module 120 routes the request to that memory module. The PHY memory access signals can be provided by memory controller 112 or by memory controller 126. Selecting which memory controller is best suited to service the request can depend upon the memory channel capacity that is supported by a particular memory controller, other hardware and software considerations, or can be based upon signal integrity issues that may exist.

For example, memory controller 112 is configured to receive load and store commands from processor device 102. In response to a load or store command for a designated memory address, switch control module 124 determines which memory module is associated with the designated memory address, and configures switch fabric 122 to connect the memory link corresponding to that memory module.

In the illustrated embodiment, memory controller 126 is configured to be placed in an inactive or active mode based upon control information received from switch control module 124. In the inactive mode, memory controller 126 is placed in a low-power or other state so that it performs no operations. In the active mode, memory controller 126 can be configured to receive memory commands received at switch fabric 122. Based upon the received memory commands, memory controller 126 can provide PHY memory access requests to the appropriate memory module via a corresponding memory link.

In one embodiment, each of the memory modules 142-148 and memory controllers 112-118 can be assigned a unique set of memory addresses. Thus, for example, memory controller 112 can be assigned the set of memory addresses associated with memory module 141, while memory controller 114 is assigned the set of memory addresses associated with memory module 144. In response to a power-on reset event, switch control module 124 controls switch fabric 122 to provide a connection between each memory controller and the memory module associated with the corresponding set of memory addresses. Thus, for example, switch fabric 122 can provide a connection between link 103 and 143, between link 105 and 145, between link 107 and 147, and between link 109 and 149. These connections support communication of memory access requests between processor 102 and memory module 142, between processor 104 and memory module 144, between processor 106 and memory module 146, and between processor 108 and memory module 148. Switch control module 124, upon receipt of an event indicator from control module 130, can reconfigure switch fabric 122 to provide alternative link connections. For example, control module 130 can inform switch control module 124 that processor 104 has failed. In response, switch control module 124 can place memory controller 126 into an active mode and further can configure memory controller 126 to receive memory commands associated with the set of memory addresses previously associated with processor 104. In response to, for example, receiving a memory command from processor 102 for a memory address associated with memory module 144, switch control module 124 can configure switch fabric 122 to connect link 103 to link 145.

Control module 130 can issue an event indicator, requesting switch control module 124 to reconfigure switch fabric 122 connectivity for a number of reasons. For example, as described above, if a processor device fails, switch fabric 122 can reconfigure link connectivity so that a memory module associated with that failed processor device can be accessed by another processor device. In another embodiment, an operating system executing at the data processing device 100 can request that control module 130 reassign memory resources from a processor device that requires less memory to another processor device that can benefit from having more memory. Furthermore, each processor device can include multiple central processing unit (CPU) cores, and each core can be assigned one or more than one task. Switch fabric 122 can maintain the most recent link connectivity until instructed otherwise by switch control module 124, or it can reestablish a default link connectivity after each memory access that required a non-default link connectivity. Control module 130 can support and schedule multiple events if required. For example, if processor 106 and processor 108 both issue a request to access memory module 144, control module 130 can first direct switch module 120 to service one request, followed by the second request when the first request is complete.

Figure 2:
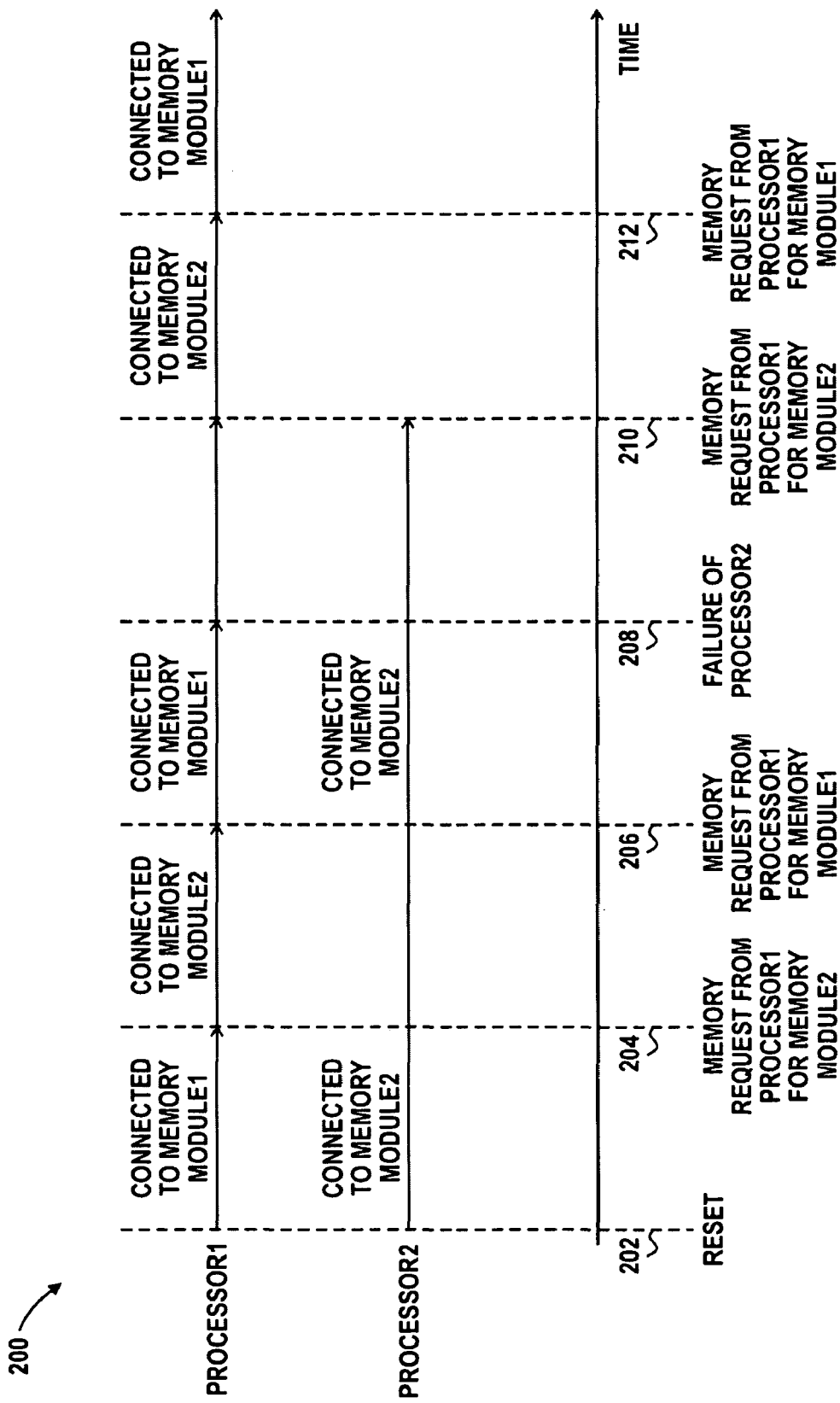
FIG. 2 includes a graph illustrating memory accesses at sequential points in time in accordance with a specific embodiment of the present disclosure.

FIG. 2 includes a graph illustrating memory accesses at sequential points in time in accordance with a specific embodiment of the present disclosure. The graph illustrates a particular sequence of operations performed by data processing device 100 of FIG. 1. The vertical axis designates two processors corresponding to processor 102 (labeled PROCESSOR1), and processor 104 (labeled PROCESSOR2). The horizontal axis represents time, increasing to the right. Specific points of time are indicated by references 202, 204, 206, 208, 210, and 212. Each referenced point in time corresponds to a particular stated event.

At time point 202, processor 102, processor 104, and other devices and modules of data processing device 100 receive a reset signal or undergo a reset procedure. Switch module 120, and switch fabric 122 in particular, are configured to connect link 103 with link 143, and to connect link 105 with link 145. Thus, processor 102 is connected to memory module 142 via links 103 and 143, and processor 104 is connected to memory module 144 via links 105 and 145.

At time point 204, processor 102 issues a request to access data contained in memory module 144. Control module 130 configures switch control module 124 to configure switch fabric 122 to connect link 103 with link 145. Memory controller 112 at processor 102, or memory controller 126 at switch module 120 performs the requested access, and data is transferred via links 103 and 145. At this time, processor 104 cannot access memory module 144, however switch fabric 122 can provide link connectivity such that processor 104 can access another memory module, such as memory module 142, memory module 146, or memory module 148. Switch fabric 122 can maintain the current connectivity, or it can reestablish a default connectivity, such as the connectivity provided when device 100 is reset. At time 206, processor 102 issues a request to access data contained in memory module 142. If not already configured to support the access, switch fabric 122 will connect link 103 and 143, and the memory access can be performed as previously described. At this time, processor 104 can once again access memory module 144.

At time 208, a failure occurs at processor 104, rendering the processor device and its associated memory controller 114 unavailable. At time 210, processor 102 issues a request to access data contained in memory module 144. Switch fabric 122 is configured to connect link 103 to link 145, thereby enabling the access. At time 212, processor 102 once again issues a request to access memory module 142, and switch fabric enables the request by connecting link 103 to link 143.

Figure 3:
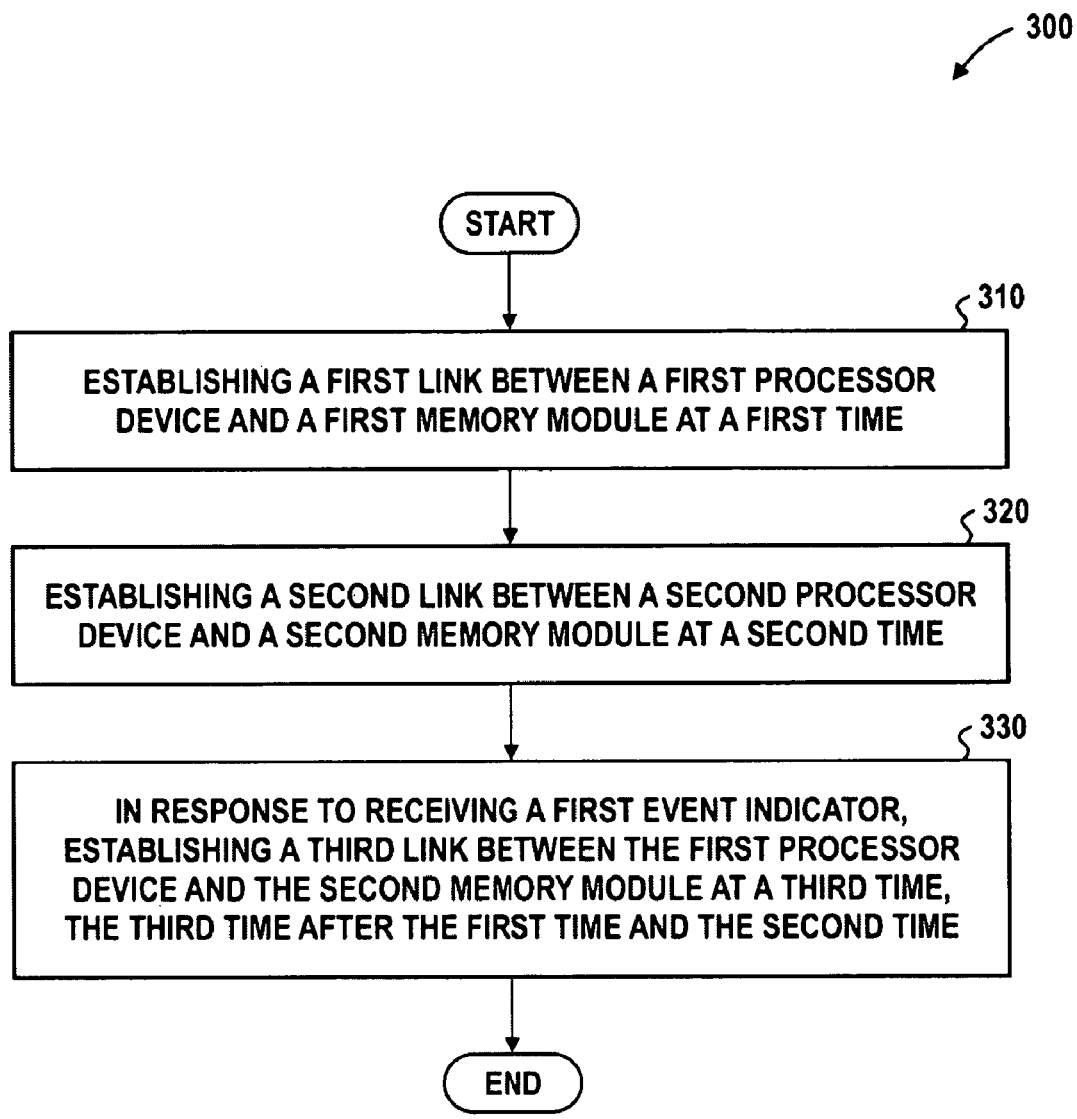
FIG. 3 includes a flow diagram illustrating a method in accordance with a specific embodiment of the present disclosure.

FIG. 3 is a flow diagram illustrating a method in accordance with a specific embodiment of the present disclosure. The flow describes a procedure by which a switch module, such as switch module 120 at FIG. 1, can provide a connection between a processor device, such as processor 102, and, selectively, either of two memory modules, such as memory module 142 and memory module 144, all at FIG. 1. At block 310, a first link is established between a first processor device, such as processor 102, and a first memory module, such as memory module 142, at a first time. Switch module 120 can establish the link by connecting link 103 to link 143. At block 320, a second link is established between a second processor device, such as processor 104, and a second memory module, such as memory module 144, at a second time. Switch module 120 can establish the link by connecting link 105 to link 145. At block 330, in response to receiving a first event indicator, a third link is established between the first processor device, processor 102, and the second memory module, memory module 144 at a third time, the third time after the first time and the second time. Switch module 120 can establish the link by connecting link 103 to link 145.

Figure 4:
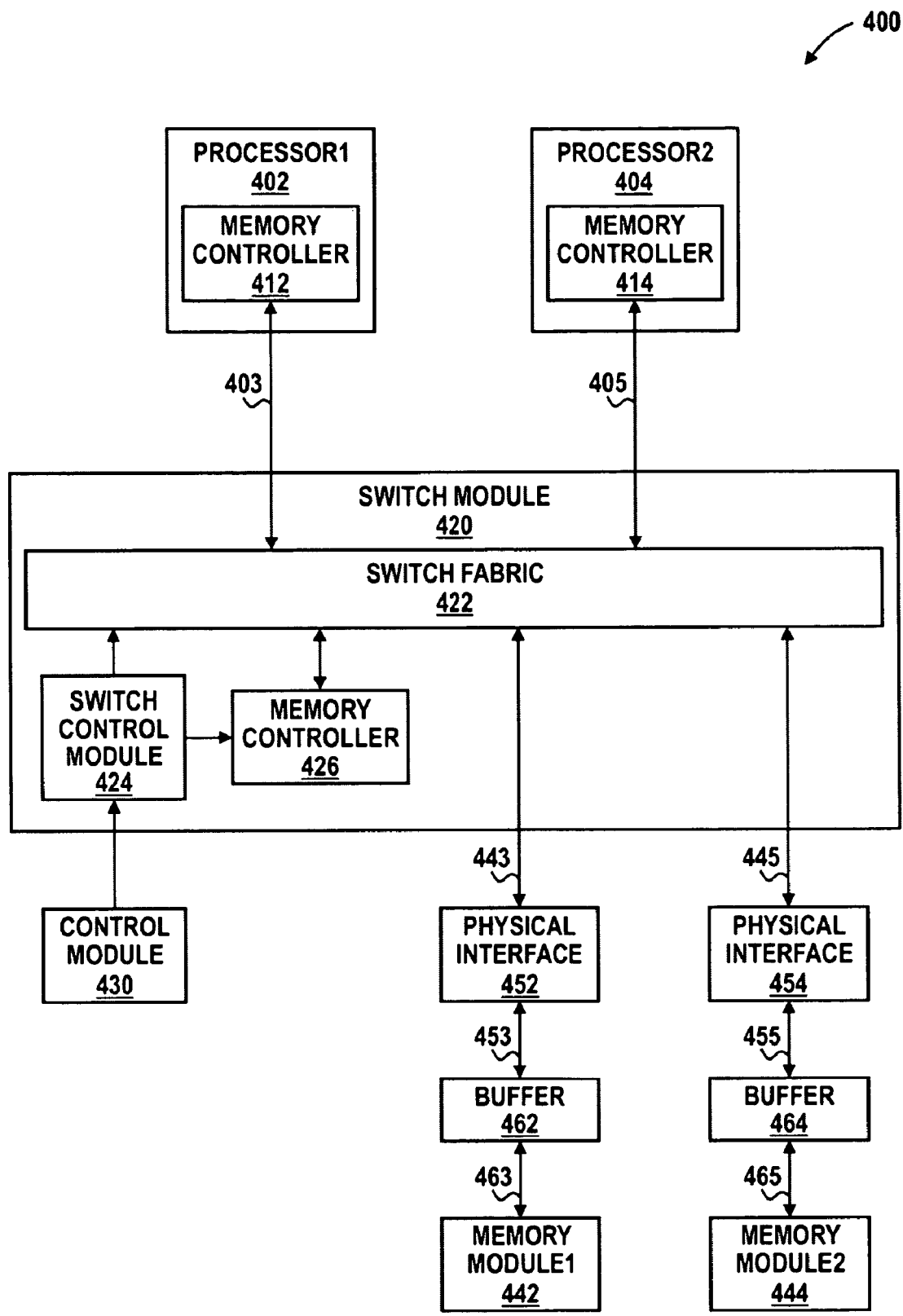
FIG. 4 includes a block diagram illustrating a multiprocessor device in accordance with a particular embodiment of the present disclosure.

FIG. 4 includes a block diagram illustrating a multiprocessor device 400 in accordance with a particular embodiment of the present disclosure. Multiprocessor device 400 provides a processor device with access to a memory module that is normally associated with another processor device. Multiprocessor device 400 includes processor devices 402 and 404, switch module 420, control module 430, memory modules 442 and 444, physical interfaces 452 and 454, buffers 462 and 464, and links 403, 405, 443, and 445. Processor device 402, labeled "PROCESSOR1", includes memory controller 412, and processor device 404, labeled "PROCESSOR2", includes memory controller 414. Switch module 420 includes switch fabric 422, switch control module 424, and memory controller 426.

Switch fabric 422 is connected to memory controller 412 via link 403, and to memory controller 414 via link 405. Switch fabric 422 is also connected to physical interface 452 via link 443, and to physical interface 454 via link 445. Switch fabric 422 has a first input and a second input. Switch control module 424 has an input, a first output connected to the first input of switch fabric 422 to configure switch fabric link connectivity, and a second output. Memory controller 426 has an input connected to the second output of switch control module 424 to receive memory access requests, and an output connected to the second input of switch fabric 422 to provide memory access control. Control module 430 has an output connected to the input of switch control module 424 to provide memory control information that includes an event indicator and information identifying which processor device is requesting access to which memory. Physical interface 452 is connected to buffer 462 via interconnect 453, and buffer 462 is connected to memory module 442, labeled "MEMORY MODULE1", via interconnect 463. Physical interface 454 is connected to buffer 464 via interconnect 455, and buffer 464 is connected to memory module 444, labeled "MEMORY MODULE2", via interconnect 465.

Switch module 420, and switch fabric 422 in particular, can provide a connection between links 403 and 443, and between links 405 and 445. These connections support memory access between processor 402 and memory module 442, and between processor 404 and memory module 444. For example, processor 402, using memory controller 412, can read or write data to memory 442 via links 403 and 443. In a particular embodiment, memory controller 426 of switch module 420 can facilitate this access instead of memory controller 412.

Switch control module 424, upon receipt of an event indicator and access-information from control module 430, can reconfigure switch fabric 422 to provide alternative link connections. For example, control module 430 can inform switch control module 424 that processor 402 has issued a request to access memory module 444 to perform a read or a write operation. In order to support the access, switch control module 424 configures switch fabric 422 to connect link 403 to link 445. Processor 402, using memory controller 412, can read or write data to memory 444 via links 403 and 445. In a particular embodiment, memory controller 426 of switch module 420 can facilitate this access instead of memory controller 412.

Links 403, 405, 443, and 445 are high-speed links and switch module 420 can interconnect these links as just described. Physical interfaces 452 and 454 can translate information transferred via links 443 and 445, respectively, into another protocol suitable for interfacing with memory module 442 and memory module 444, when memory modules 442 or 444 are accessed during a memory write operation. Similarly, physical interfaces 452 and 454 can translate information transferred via links 453 and 455, respectively, into the protocol supported by links 443 and 445, when memory modules 442 or 444 are accessed during a memory read operation. For example, links 403, 405, 443, and 445 can be HT links, or can support another link protocol, and interconnects 453, 455, 463, and 465 can conduct DDR PHY signals. Using switch module 420 to interconnect links that communicate data at a higher-level bus protocol can alleviate signal integrity degradation issues that can occur if switch module 420 were to interconnect links that communicate PHY signals. Buffers 462 and 464 are optionally included, and their inclusion can permit locating memory modules 442 and 444 at a greater distance from the other portions of multiprocessor device 400, or can facilitate including a greater number of individual memory devices at a particular memory module. Buffers 462 and 464 can include impedance termination devices to further improve the signal integrity of signals communicated by interconnects 453, 455, 463, and 465.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, specific memory types and interface protocols, bus protocols, and other industry standards have been described. Specific numbers of processor devices and memory modules have been illustrated. After reading this specification, skilled artisans will understand that specific protocols and standards, and a specific number of processor devices, processor device cores, and memory modules are described for the purpose of example, and should not be considered as limiting the scope of the present disclosure.

A memory controller, such as memory controller 112 and 126, can support one or more than one data channel. A memory module, such as memory module 142, can include one or more than one individual memory packages, such as a dual in-line memory module (DIMM). The memory module can include DRAM, static RAM, another class of memory, or any combination thereof Links, such as link 103 and 143, can conduct DDR PHY signals, support one or more than one data channel, support transmission of another memory interface, bus, or link protocol, or any combination thereof.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   coupling a first processor device to a first memory module for a first phase;
   coupling a second processor device to a second memory module for the second phase; and
   in response to a request from an operating system to reassign some but not all memory resources from the second processor device to the first processor device, coupling the first processor device to the second memory module for a third phase.

2. The method of claim 1, further comprising coupling the first processor device to the first memory module for a fourth phase, the fourth phase after the third phase.

3. The method of claim 2, wherein coupling the first processor device to the first memory module for the fourth phase comprises coupling the first processor device to the first memory module for the fourth phase in response to a memory request associated with the first memory module.

4. The method of claim 1, wherein coupling the first processor device to the second memory module comprises coupling the first processor device to the second memory module in response to a memory request associated with the second memory module.

5. The method of claim 1, further comprising communicating a first memory request from the first processor device to a first memory controller during the first phase, the first memory request associated with the second memory module.

6. The method of claim 5, further comprising communicating a second memory request from the first processor device to a second memory controller during the second phase, the second memory request associated with the second memory module.

7. The method of claim 1, wherein coupling comprises providing an interconnect to propagate physical layer memory interface signals.

\* \* \* \* \*